Dec. 24, 1957 A. G. FOX 2,817,812

NON-RECIPROCAL HYBRID STRUCTURES

Filed Aug. 7, 1953

INVENTOR
A. G. FOX
BY Hugh S. Wertz
ATTORNEY

United States Patent Office 2,817,812 Patented Dec. 24, 1957

2,817,812

NON-RECIPROCAL HYBRID STRUCTURES

Arthur G. Fox, Rumson, N. J., assignor to Bell Telephone Laboratories, Incorporated, New York, N. Y., a corporation of New York Application August 7, 1953, Serial No. 372,848

4 Claims. (Cl. 324—58)

This invention relates to electrical transmission systems and, more particularly, to multibranch circuits having non-reciprocal transmission properties.

An object of this invention is to provide improved means for non-reciprocal power division.

The invention to be described herein will be found to have numerous uses in systems requiring power division between various branches of the system. In particular, the system illustrated in the accompanying Fig. 1 to be described presently in more detail utilizes variable power division between two branches of a phase measuring network.

According to the invention, a four terminal microwave junction has interposed between two pairs of conjugately related terminals a non-reciprocal polarizing element whose polarizing effect can be varied separately or in conjunction with the relative angular alignment of the terminal pairs so that any desired power division can be obtained between terminals of the junction.

In the specific embodiment of the invention shown herein, the non-reciprocal property of the polarizing element is supplied by a Faraday-effect material. As will be shown, this material rotates the polarization of the electric vector of electrical energy passing through it with respect to a plurality of spatially oriented branches or connecting terminals in such a way that energy applied to one branch or terminal thereof is divided in a certain ratio between certain terminals for a given direction of transmission but in another ratio and/or between other terminals for the opposite direction of transmission.

The nature of the present invention and its advantages will appear more fully upon consideration of the following detailed description of the accompanying drawings.

Figure 1:
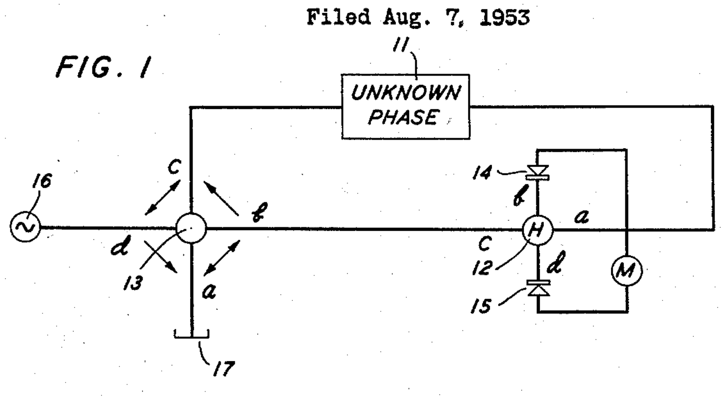
Fig. 1 is a schematic circuit of a phase measuring system embodying a variable power divider in accordance with the present invention.

Referring now in more detail to the drawings, Fig. 1 shows an illustrative example of a phase comparison system employing the present invention as a component element. A transmission network 11 having unknown phase and power loss characteristics is connected between arm *a* of a normal hybrid junction 12 and arm *c* of element 13. Element 13 represents a power divider in accordance with the present invention having the unusual power division properties to be described in detail hereafter and which because of these properties forms the basis of the operation of the present phase comparison system. Element 12 may be substantially the same as the structure shown in Fig. 9.5–4(*a*), page 340, of "Principles of Waveguide Transmission," by G. C. Southworth, Van Nostrand Co., 1950. This element 12 is connected in the system in such a way that signals equal but 90 degrees out of phase applied to terminals *a* and *c* produce equal voltages in arms *b* and *d*. Crystal detectors 14 and 15, connected as shown, then produce direct voltages which balance across meter M. A departure from this balanced voltage condition will cause a reading of M. Signal source 16 connected to terminal *d* of divider 13 supplies power in an easily varied ratio to arms *a* and *c* of the divider. The power which goes to arm *c* is, during its passage to arm *a* of hybrid 12, shifted in phase and attenuated by network 11. Power going to arm *a* of element 13 is reflected thereby piston 17 and shifted in phase by an amount determined by the position of the piston. Upon reflection, because of the non-reciprocal property of divider 13, a determinable amount of the power flows from arm *a* to arm *b* where it is led directly to arm *c* of hybrid 12. Thus, by adjusting the ratio of power division between arms *a* and *c* of divider 13 and by adjusting the position of piston 17, it is possible to measure the relative phase and attenuation versus frequency characteristics of network 11.

Figure 2:
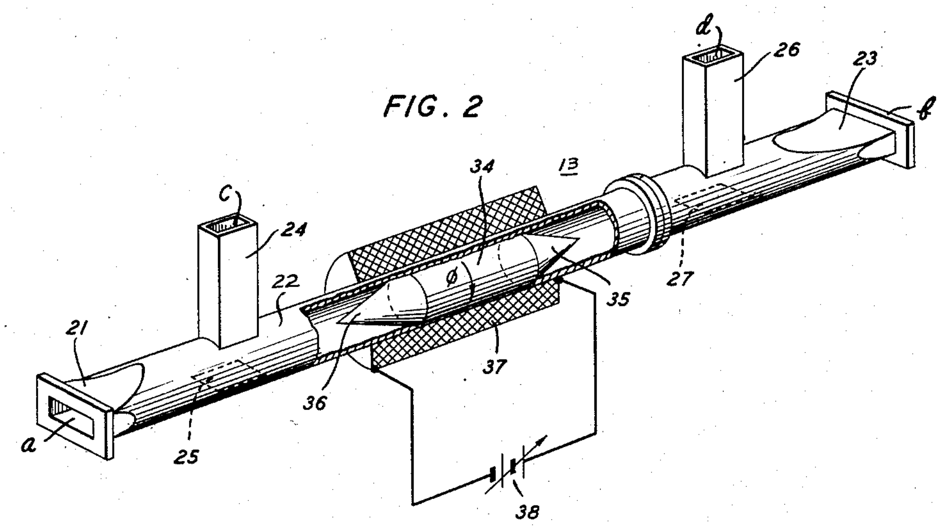
Fig. 2 is a perspective view of a specific embodiment of the invention.

Fig. 2 shows, by way of example, a specific embodiment of the invention. The wave-guide network interconnecting the terminals *a*, *b*, *c* and *d* which correspond to the terminals of element 13 in Fig. 1 comprises a circular wave guide 22 which tapers smoothly and gradually toward its left-hand end into a rectangular wave guide 21. Guide 22 is joined near its left end by a second rectangular guide 24 in a shunt or H-plane junction. The rectangular wave guides 21 and 24 will accept and support only plane waves in which the component of the electric vector which determines the plane of polarization of the wave is consistent with the dominant $TE_{10}$ mode in rectangular wave guides. Likewise, the dimension of circular guide 22 is preferably chosen so that only the wave polarization of the dominant $TE_{11}$ mode in it can be propagated. By means of the smooth transition from the rectangular cross-section of guide 21 to the circular cross-section of guide 22, the $TE_{10}$ mode, i. e., the wave having a plane of polarization parallel to the narrow dimension of the rectangular cross-section of guide 21, may be coupled to and from the $TE_{11}$ mode in circular guide 22 which has a similar or parallel polarization. Any other polarization of wave energy in guide 22 will not pass through the polarization selective terminal comprising guide 21. Guide 24 is physically oriented with respect to guides 21 and 22 so that the $TE_{10}$ mode in guide 24 is coupled by way of the shunt plane junction between the rectangular cross-section of guide 24 and the circular cross-section of guide 22 into the particular $TE_{11}$ code in circular guide 22 which is polarized perpendicular to the $TE_{11}$ mode introduced therein by guide 21. Thus, guides 21 and 24 comprise a pair of polarization selective connecting terminals by which wave energy in two orthogonal $TE_{11}$ mode polarizations may be coupled to and from one end of guide 22. Furthermore, these guides comprise a pair of conjugately related terminals or branches inasmuch as a wave launched in one will not appear in the other. A highly conductive reflecting vane 25, such as shown in copending application of A. P. King, Serial No. 260,137, filed December 6, 1951, now Patent 2,682,610, granted June 29, 1954, is preferably diametrically disposed in circular guide 22 opposite the junction of guide 24 in order to reflect into guide 24 those waves which have their plane of polarization coincident with the plane of vane 25.

At the other end of guide 22 is a similar pair of polarization selective conjugate terminals comprising rectangular guides 23 and 26 coupled to orthogonally related waves in guide 22, which waves are polarized in planes inclined $\alpha$ degrees, where $\alpha$ is determined by the relative rotation of the rotating joint in guide 22, to the planes of the corresponding waves, respectively, to which guides 21 and 24 are coupled. Thus, guide 22 tapers into a rectangular guide 23 which supports a wave polarized in a plane inclined $\alpha$ degrees with respect to the polarization of the wave in guide 21. Guide 22 is joined in a shunt plane junction by a second rectangular guide 26 which is perpendicular to both guides 22 and 23 and which will accept waves from guide 22 having a plane of polarization inclined $\alpha$ degrees to the polarization of those waves accepted by guide 24. A highly conductive reflecting vane 27 is positioned with respect to the aperture of guide 26 and bears the same relation thereto as vane 25 to the aperture of guide 24. It is obvious to one skilled in the art that any of a number of well-known coupling means may be employed in lieu of one or more of the wave guides 21, 23, 24 and 26 to couple to and from the proper polarizations of waves in guide 22.

Interposed between the first pair of conjugate terminals comprising guides 21 and 24 and a second pair of conjugate terminals comprising guides 23 and 26 in the path of wave energy passing therebetween in guide 22 is suitable means of the type which produces an antireciprocal rotation of the plane of polarization of these electromagnetic waves, for example, a Faraday-effect element having such properties that an incident wave impressed upon a first side of the element emerges on the second side polarized at a different angle from the original wave and an incident wave impressed upon the second side emerges from the first side with an additional rotation of the same angle. Thus, the polarization of a wave passing through the element first in one direction and then in the other direction undergoes two successive space rotations or space phase shifts in the same sense, thereby doubling the rotation undergone in a single passage. As is illustrated by way of example in the drawing, this means comprises a Faraday-effect element 34 with accompanying conical transition members 35 and 36 which may be of polystyrene and are provided to cut down reflections from the faces of the element 34, mounted inside guide 22 approximately midway between the conjugate pairs. As a specific embodiment, element 34 may be a block of magnetic material, for example nickel-zinc ferrite prepared in the manner disclosed in the copending application of C. L. Hogan, Serial No. 252,432, filed October 22, 1951, now Patent 2,748,353, granted May 29, 1956, having a thickness of the order of magnitude of a wavelength. This material was found to operate satisfactorily as a directionally selective Faraday-effect rotator for polarized electromagnetic waves to an extent up to 90 degrees or more when placed in the presence of a longitudinal magnetizing field of strength substantially below that required to produce ferromagnetic resonance in the material. The thickness of this material necessary to produce such rotation is small enough so that waves in the centimeter range may be transmitted through with substantially negligibile attenuation. Suitable means for producing the necessary longitudinal magnetic field surrounds element 34 and may, for example, be a solenoid 37 mounted on the outside of guide 22 and supplied by an adjustable source 38 of energizing current.

The angle of rotation of polarized electromagnetic waves in such magnetic material is approximately directly proportional to the thickness traversed by the waves and to the intensity of the magnetization to which the material is subjected. Thus, it is possible to adjust the amount of rotation by properly choosing the thickness of the magnetic material comprising element 34 and by varying the magnetic field supplied by solenoid 37.

Figure 3:
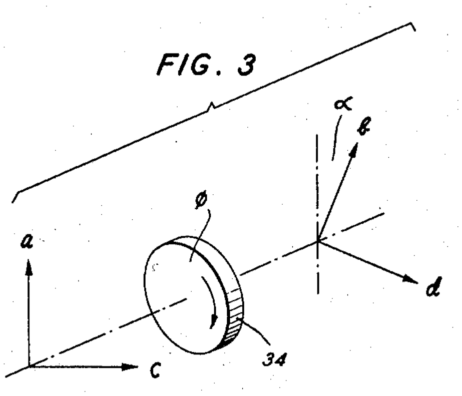
Fig. 3 is a schematic representation of the embodiment shown in Fig. 2.

Fig. 3 is a schematic representation of the structure shown in Fig. 2. The arrows indicate possible directions of wave polarizations in guides 21, 23, 24, 26. The electric polarization at terminal *b* is shown inclined with respect to that at terminal *a* and the angle of rotation produced by element 34 is represented by $\varphi$ degrees in the same sense as $\alpha$. The voltage at each terminal with respect to the voltages at the other terminals may then be expressed as follows:

$$V_a = V_b \cos(\varphi+\alpha) - V_d \sin(\varphi+\alpha) \quad (1)$$

$$V_c = V_b \sin(\varphi+\alpha) + V_d \cos(\varphi+\alpha) \quad (2)$$

$$V_b = V_a \cos(\varphi-\alpha) - V_c \sin(\varphi-\alpha) \quad (3)$$

$$V_d = V_a \sin(\varphi-\alpha) + V_c \cos(\varphi-\alpha) \quad (4)$$

These equations show mathematically that a voltage applied to any one of the four terminals *a*, *b*, *c*, *d* can be divided in any desired ratio between two terminals conjugately related to each other. Thus, when $\varphi$ and $\alpha$ are both equal to 22½ degrees, all of the power applied to terminal *a* goes to terminal *b*, half the power applied to *b* goes to *a* and half to *c*, all the power applied to *c* goes to *d*, and finally, half the power applied to *d* goes to *a* and half to *c*. This particular ratio of power division is used to advantage in the system of Fig. 1 when network 11 is essentially lossless. All of the power reaching arm *a* is transmitted to arm *b* while none is transmitted to arm *d*. When $\varphi$ and $\alpha$ are both equal to some other value, but less than 45 degrees, so that the angle of rotation is equal to the angle between terminals *a* and *b*, but different from the angle between terminals *b* and *c*, the division of power applied to *b* or *d* divides unequally between *a* and *c* with still no transmission from *a* to *d* or from *c* to *b*. This particular characteristic is the one referred to above in the discussion of the system of Fig. 1 to measure both the phase and attenuation versus frequency characteristic of network 11. This non-reciprocal property is not found in directional couplers or hybrid junctions such as have been previously used for power division.

Figure 4:
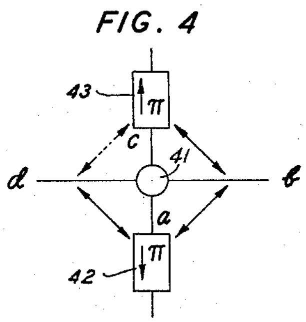
Fig. 4 is representative of the equivalent circuit of the embodiment shown in Fig. 2 under one condition of adjustment.

When $\varphi$=90 degrees and $\alpha$=45 degrees, there is equal power division between conjugately related terminals. A circuit having equivalent characteristics is shown in Fig. 4 wherein a normal hybrid 41, such as hybrid 12 in Fig. 1, has connected to branches *a* and *c* gyrators 42 and 43 of the type described in copending application, Serial No. 288,288, filed May 16, 1952, by A. G. Fox. Shifting these gyrators to different arms of hybrid 41 is equivalent to changing to certain other values the angles $\varphi$ and $\alpha$ in Fig. 3. It should be noted that in addition to non-reciprocal power division in this structure, and in the more general one shown in Fig. 3, there is also non-reciprocal shifting of voltage phases. Thus in Fig. 4, the solid arrows between terminals of hybrid 41 indicate no phase shift in voltage between terminals *ab*, *da* or *bc* while the dotted arrow between terminals *dc* indicates phase shift in voltage of 180 degrees. The addition to hybrid 41 of elements 42 and 43, which elements each produce a voltage inversion of 180 degrees in the direction of the arrow, but no voltage inversion in the opposite direction, brings about the non-reciprocal phase characteristic of the overall circuit corresponding to the phase characteristic of Fig. 3 when $\varphi$=90 degrees and $\alpha$=45 degrees.

The above-described illustrative embodiment can easily be adapted for numerous uses in addition to that suggested herein. To this end, various changes or modifications will occur to those skilled in the art and may be made without departing from the scope of the invention as set forth.

What is claimed is:

1. A power dividing network comprising two pairs of wave-guide branches and a single common branch connecting each pair to the other, said wave-guide branches of each pair being connected in conjugate relation to each other and in coupling relation to said common branch, one pair of branches being displaced about an axis of said common branch with respect to the other pair of branches to provide a first angle between a first branch of said one pair of branches and a first branch of said other pair of branches and to provide a second angle between said first branch of said other pair and the second branch of said one pair, one of said angles being less than 45 degrees and greater than zero degrees and the other being greater than 45 degrees and less than 90 degrees, and a Faraday-effect element interposed in said common branch producing an angle of wave polarization rotation different from at least one of said angles.

2. A wave transmission system including a first pair of conjugately related wave-guide branches, a second pair of conjugately related wave-guide branches separated from said first pair and angularly inclined about an axis, at an angle of 22½ degrees between one branch of said first pair and one branch of said second pair and 67½ degrees between said one branch of said second pair and the other branch of said first pair, and means positioned along said axis for producing antireciprocal rotation of 22½ degrees of the plane of polarization of waves propagating along said axis.

3. A system for measuring unknown characteristics of a high frequency electromagnetic wave guide device, said system comprising in combination a power dividing network comprising first and second pairs of wave guide branches and a single common branch connecting each pair to the other, said wave guide branches of each pair being connected in conjugate relation to each other and in coupling relation to said common branch, one pair of branches being displaced about an axis of said common branch with respect to the other pair of branches to provide a first angle between a first branch of said first pair and a first branch of said second pair and to provide a second angle between said first branch of said second pair and the second branch of said first pair, and a Faraday-effect element interposed in said common branch producing an angle of wave polarization rotation that is different from at least said second angle, a source of electromagnetic wave energy connected to the first branch of said second pair, an adjustable reflecting termination connected to the first branch of said first pair, and means for indicating a phase and amplitude balance connected between the second branch of said first pair and the first branch of said second pair with said device of unknown characteristics interposed between said means and said second branch of said first pair.

4. The system of claim 3 for measuring the phase characteristic of said device wherein said angle of rotation is 22½ degrees, wherein the angle between said first branch of said first pair and said first branch of said second pair is 22½ degrees, and wherein the angle between said first branch of said second pair and said second branch of said first pair is 67½ degrees.

References Cited in the file of this patent

UNITED STATES PATENTS

| | | |
|---|---|---|
| 2,644,930 | Luhrs | July 7, 1953 |
| 2,748,353 | Hogan | May 29, 1956 |
| 2,756,396 | Milne | July 24, 1956 |

OTHER REFERENCES

Publication I, Hogan, "The Microwave Gyrator," The Bell System Technical Journal, vol. 31, No. 1, January 1952, pages 1–31.